(12) United States Patent
Yu et al.

(10) Patent No.: US 8,473,430 B2
(45) Date of Patent: Jun. 25, 2013

(54) DEEP-STRUCTURED CONDITIONAL RANDOM FIELDS FOR SEQUENTIAL LABELING AND CLASSIFICATION

(75) Inventors: Dong Yu, Kirkland, WA (US); Li Deng, Redmond, WA (US); Shizhen Wang, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 635 days.

(21) Appl. No.: 12/696,051

(22) Filed: Jan. 29, 2010

(65) Prior Publication Data
US 2011/0191274 A1 Aug. 4, 2011

(51) Int. Cl.
*G06F 15/18* (2006.01)

(52) U.S. Cl.
USPC .......................................................... 706/12

(58) Field of Classification Search
USPC ............................................................ 706/12
See application file for complete search history.

(56) References Cited

U.S. PATENT DOCUMENTS

| | | | |
|---|---|---|---|
| 7,418,378 B2* | 8/2008 | Parkinson | 704/9 |
| 7,627,473 B2* | 12/2009 | Gunawardana et al. | 704/250 |
| 7,689,419 B2* | 3/2010 | Mahajan et al. | 704/256.2 |
| 7,689,527 B2* | 3/2010 | Pavlov et al. | 706/45 |
| 7,840,503 B2* | 11/2010 | Narasimhan et al. | 706/12 |
| 7,873,209 B2* | 1/2011 | Deng et al. | 382/159 |
| 7,890,438 B2* | 2/2011 | Chidlovskii | 706/12 |
| 7,912,288 B2* | 3/2011 | Winn et al. | 382/181 |
| 8,194,965 B2* | 6/2012 | Lossev et al. | 382/132 |
| 2006/0115145 A1 | 6/2006 | Bishop et al. | |
| 2008/0201279 A1 | 8/2008 | Kar et al. | |
| 2009/0198671 A1 | 8/2009 | Zhang et al. | |
| 2009/0216739 A1 | 8/2009 | Kirpal et al. | |

OTHER PUBLICATIONS

Levow, Gina-Anne, "Automatic Prosodic Labeling with Conditional Random Fields and Rich Acoustic Features", Retrieved at <<http://people.cs.uchicago.edu/~levow/papers/crf.pdf>> In the proceedings of the Third International Joint Conference on Natural Language Processing, Feb. 21, 2008, pp. 6.

Sokolovska, et al., "Efficient Learning of Sparse Conditional Random Fields for Supervised Sequence Labelling", Retrieved at <<http://arxiv.org/PS_cache/arxiv/pdf/0909/0909.1308v1.pdf>> Sep. 7, 2009, pp. 1-20.

(Continued)

*Primary Examiner* — Michael B Holmes
(74) *Attorney, Agent, or Firm* — Gonzalez Saggio & Harlan LLP

(57) ABSTRACT

Described is a technology by which a deep-structured (multiple layered) conditional random field model is trained and used for classification of sequential data. Sequential data is processed at each layer, from the lowest layer to a final (highest) layer, to output data in the form of conditional probabilities of classes given the sequential input data. Each higher layer inputs the conditional probability data and the sequential data jointly to output further probability data, and so forth, until the final layer which outputs the classification data. Also described is layer-by-layer training, supervised or unsupervised. Unsupervised training may process raw features to minimize average frame-level conditional entropy while maximizing state occupation entropy, or to minimize reconstruction error. Also described is a technique for back-propagation of error information of the final layer to iteratively fine tune the parameters of the lower layers, and joint training, including joint training via subgroups of layers.

20 Claims, 5 Drawing Sheets

OTHER PUBLICATIONS

Jiao, et al., "Semi-Supervised Conditional Random Fields for Improved Sequence Segmentation and Labeling", Retrieved at <<http://www.metabolomics.ca/News/publications/Jiao_et_al.pdf>> In the proceedings of the 21st International Conference on Computational Linguistics and the 44th annual meeting of the Association for Computational Linguistics, 2006, pp. 209-216.

Arasu, et al., "Extracting Structured Data from Webpage", Retrieved at <<http://infolab.stanford.edu/~arvind/papers/extract-sigmod03.pdf>> In the proceedings of the international conference on Management of data, 2003, pp. 337-348.

Jones, et al., "The Linguistic Structure of English Web-Search Queries", Retrieved at <<http://www.aclweb.org/anthology/D/D08/D08-1107.pdf>> In the proceedings of the Conference on Empirical Methods in Natural Language Processing, 2008, pp. 1021-1030.

Bishop, C.M., "Pattern Recognition and Machine Learning", Retrieved at <<http://www.cis.hut.fi/Opinnot/T-61.6020/2007/sequential_data.pdf>> Apr. 23, 2007, pp. 31.

Chang, et al., "Guiding Semi-Supervision with Constraint-Driven Learning", Retrieved at <<http://acl.ldc.upenn.edu/P/P07/P07-1036.pdf>> In the proceedings of the 45th Annual Meeting of the Association of Computational Linguistics, 2007, pp. 280-287.

Darroch, et al., "Generalized Iterative Scaling for Log-Linear Models", Retrieved at <<http://www.jstor.org/pss/2240069>> Oct. 1972, vol. 43, No. 5, pp. 2.

Deng, et al., "A Bidirectional Target-Filtering Model of Speech Coarticulation and Reduction: Two-Stage Implementation for Phonetic Recognition", Retrieved at <<http://ieeexplore.ieee.org/stamp/stamp.jsp?tp=&arnumber=1561282&isnumber=33144>> In the proceedings of IEEE Transactions on Audio, Speech, and Language Processing, Vol. 14, No. 1, Jan. 2006, p. 256-265.

Deng, et al. "Structured Speech Modelling", Retrieved at <<http://ieeexplore.ieee.org/stamp/stamp.jsp?tp=&arnumber=1677971&isnumber=35293>> In the proceedings of IEEE Transactions on Audio, Speech, and Language Processing, vol. 14, No. 5, Sep. 2006, pp. 1492-1504.

Grenager, et al., "Unsupervised Learning of Field Segmentation Models for Information Extraction", Retrieved at http://nlp.stanford.edu/pubs/unsupie_final.pdf>> In the Proceedings of the 43rd Annual Meeting on Association for Computational Linguistics, 2005, pp. 371-378.

Hermansky, et al, "Tandem Connectionist Feature Extraction for Conventional HMM Systems", Retrieved at <<ftp://ftp.icsi.berkeley.edu/pub/speech/papers/icassp00-nnhmm.pdf>> 2005, pp. 635-1638.

Hinton, et al., "Reducing the dimensionality of data with neural networks", Retrieved at <<http://www.cs.toronto.edu/~hinton/science.pdf>> vol. 313, No. 5786, Jul. 28, 2006, pp. 504-507.

Lafferty, et al., "Conditional Random Fields: Probabilistic Models for Segmenting and Labeling Sequence Data", Retrieved at <<http://www.cis.upenn.edu/~pereira/papers/crf.pdf>> In the proceedings of the Eighteenth International Conference on Machine Learning, 2001, pp. 282-289.

Ladicky, et al., "Associative Hierarchical CRFs for Object Class Image Segmentation", Retrieved at <<http://pascallin.ecs.soton.ac.uk/challenges/VOC/voc2009/workshop/ladicky.pdf>> 2009, pp. 29.

Li, et al., "Learning query intent from regularized click graph", Retrieved at <<http://research.microsoft.com/pubs/75219/2008-LisigIR.pdf>> In the Proceedings of the 31st Annual International ACM SIGIR conference on Research and Development in Information Retrieval, Jul. 20-24, 2008, pp. 339-346.

Li, et al., "Extracting Structured Information from User Queries with Semi-Supervised Conditional Random Fields", Retrieved at <<http://www.cc.gatech.edu/~zha/CSE8801/query-annotation/p572-Ii.pdf>> In the proceedings of the 32nd international ACM SIGIR conference on Research and development in information retrieval, Jul. 19-23, 2009, pp. 572-579.

Li, Xiao, "On the Use of Virtual Evidence in Conditional Random Fields", Retrieved at <<http://www.aclweb.org/anthology/D/D09/D09-1134.pdf>> In the proceedings of the 2009 Conference on Empirical Methods in Natural Language Processing, Aug. 6-7, 2009, pp. 1289-1297.

Liao, et al., "Hierarchical Conditional Random Fields for GPS-Based Activity Recognition", Retrieved at <<http://www.springerlink.com/content/t8w1476q1h41m523/fulltext.pdf?page=1>> 2007, p. 1.

Mann, et al., "Generalized Expectation Criteria for Semi-Supervised Learning of Conditional Random Fields", Retrieved at <<http://gideon.mann.googlepages.com/xr-feat-crf3.pdf>> pp. 9.

Nocedal, Jorge, "Updating Quasi-Newton Matrices with Limited Storage", Retrieved at <<http://www.jstor.org/pss/2006193>>, Mathematics of Computation, vol. 35, No. 151, Jul. 1980, pp. 2.

Pinto, et al., "Table Extraction Using Conditional Random Fields", Retrieved at <<http://www.cs.umass.edu/~mccallum/papers/crft-able-sigir2003.pdf>> In the proceedings of the 26th annual international ACM SIGIR conference on Research and development in information retrieval, Jul. 28-Aug. 1, 2003, pp. 235-242.

Riedmiller, et al., "A Direct Adaptive Method for Faster Back-Propagation Learning: The RPROP Algorithm", Retrieved at <<http://citeseerx.ist.psu.edu/viewdoc/download;jsessionid=AA62BAD78E2A4A30B74FEB8665E90F80?doi=10.1.1.21.1417&rep=rep1&type=pdf>> In the proceedings of IEEE International Conference on Neural Networks 1993, pp. 586-591.

Viola, et al., "Learning to extract information from semi-structured text using a discriminative context free grammar", Retrieved at <<http://research.microsoft.com/en-us/um/people/viola/Pubs/DocExtract/contact_sigir05.pdf>> In the proceedings of the 28th Annual International ACM SIGIR conference on Research and development in information retrieval, 2005, pp. 330-337.

Yu, et al., "Evaluation of a Long-contextual-span Hidden Trajectory Model and Phonetic Recognizer Using A* Lattice Search", Retrieved at <<http://research.microsoft.com/pubs/76829/2005-dongyu-eurospeech.pdf>> In the proceedings of Interspeech, 2005, p. 553-556.

Yu, et al., "A Lattice Search Technique for a Long-Contextual-Span Hidden Trajectory Model of Speech", Retrieved at http://research.microsoft.com/pubs/78833/2006-dongyu-spcom.pdf >> In the proceedings of Speech Communication vol. 48 Issue: 9, Sep 2006. p. 1214-1226.

Yu, et al., "A Novel Framework and Training Algorithm for Variable-Parameter Hidden Markov Models", Retrieved at <<http://ieeexplore.ieee.org/stamp/stamp.jsp?tp=&arnumber=5165118&isnumber=5165109>> In the proceedings of IEEE Transactions on Audio, Speech, and Language Processing, Vol. 17, No. 7, Sep. 2009, pp. 1348-1360.

Yu, et al., "Using continuous features in the maximum entropy model", Retrieved at <<http://research.microsoft.com/apps/pubs/default.aspx?id=81511>> Pattern Recognition Letters. vol. 30, Issue 8, Jun. 2009, pp. 1-6.

Yu, et al., "Solving Nonlinear Estimation Problems Using Splines", Retrieved at <<http://ieeexplore.ieee.org/stamp/stamp.jsp?tp=&arnumber=5174502&isnumber=5174379>> In the proceedings of Signal Processing Magazine, IEEE, Jul. 2009, vol. 26, No. 4, pp. 86-90.

Zhao, et al., "Exploiting Structured Reference Data for Unsupervised Text Segmentation with Conditional Random Fields", Retrieved at <<http://www.siam.org/proceedings/datamining/2008/dm08_38_zhao.pdf>> In the proceedings of the SIAM International Conference on Data Mining, Apr. 24-26, 2008, pp. 420-431.

Zhu, et al., "Webpage Understanding: An Integrated Approach", Retrieved at <<http://research.microsoft.com/en-us/um/people/znie/sigkdd2007_extraction.pdf>> In the proceedings of the 13th international conference on Knowledge discovery and data mining, Aug. 12-15, 2007, pp. 903-912.

Burget, et al., "Discriminative Training Techniques for Acoustic Language Identification", Retrieved at <<http://ieeexplore.ieee.org/stamp/stamp.jsp?tp=&arnumber=1659994&isnumber=34757>> In the proceedings of IEEE International Conference on Acoustics, Speech and Signal Processing, May 14-19, 2006, vol. 1, pp. 209-212.

Campbell, et al., "Language Recognition with Support Vector Machines", Retrieved at <<http://www.II.mit.edu/mission/communications/ist/publications/040531_CampbellW_SingerE.pdf>> In the proceedings of Odyssey, the Speaker and Language Recognition Workshop, May 31-Jun. 3, 2004, pp. 41-44.

Campbell, W.M., "A Covariance Kernel for SVM Language Recognition", Retrieved at <<http://ieeexplore.ieee.org/stamp/stamp.jsp?tp=&arnumber=4518566&isnumber=4517521>> In the proceedings of IEEE International Conference on Acoustics, Speech and Signal Processing, Mar. 31-Apr. 4, 2008, pp. 4141-4144.

Torres-Carrasquillo, et al., "Approaches to Language Identification Using Gaussian Mixture Models and Shifted Delta Cepstral Features", Retrieved at http://www.egr.msu.edu/~deller/icslp-submission-copy.pdf>> In the proceedings of Int'l. Conf. Spoken Language Processing, Sep. 2002, pp. 89-92.

Yaman, et al., "A flexible classifier design framework based on multi-objective programming", Retrieved at <<http://users.ece.gatech.edu/~syaman/TASL-ICO.pdf>> IEEE Trans. on Audio, Speech, and Language Processing, 2008, vol. 16, No. 4, pp. 779-789.

Yu, et al., "Hidden conditional random field with distribution constraints for phonetic classification", Retrieved at http://research.microsoft.com/pubs/102556/HCRF-DC-PhoneClass-Interspeech2009.pdf>> In the proceedings of Interspeech, Sep. 6-10, 2009, pp. 676-679.

* cited by examiner

DEEP-STRUCTURED CONDITIONAL RANDOM FIELDS FOR SEQUENTIAL LABELING AND CLASSIFICATION

BACKGROUND

Sequential labeling and classification of data has many applications, including those in natural language processing and speech processing. Some example applications include search query tagging, advertisement segmentation, and language identification/verification.

Conditional random fields (CRFs) are discriminative models that directly estimate the probabilities of a state sequence conditioned on a whole observation sequence. For example, frames of audio signal data may be converted to features, with the state sequence predicted on all the frames. Note that this is in contrast to generative models such as the hidden Markov models (HMMs) that describe the joint probability of the observation and the states.

Because of their discriminative nature, and also because they are very flexible in choosing classification features, conditional random fields have been widely and successfully used to solve sequential labeling problems. One well-known type of conditional random field is the linear-chain conditional random field, which is commonly used due to its simplicity and efficiency. While acceptable performance is obtained by using linear chain conditional random fields, there are limitations associated with them. For example, such a conditional random field typically requires manual construction of the many different features that are needed to achieve good performance, as they lack the ability to automatically generate robust discriminative internal features from raw features.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a multiple layered (deep-structured) conditional random field model is used to classify an input signal such as comprising sequential data. Data corresponding to the input signal (e.g., the signal itself, features extracted therefrom and/or the like) are received and processed at each layer. The lowest layer outputs probability information, which is received at the next lowest layer and used in conjunction with the data corresponding to the input signal, to output its probability information and so forth, up to the final (highest) layer. The final layer outputs the classification, e.g., in the forms of a probability for each classification state.

Training of the deep-structured conditional random field model may include performing the training layer by layer. The final layer is trained in a supervised manner using labeled training data. In one implementation, the intermediate/lower layers may be trained in supervised manner as long as their states match the final layer's output states. In another implementation, the layers' states need not match, however the lower layers are trained unsupervised; e.g., based upon raw features, training of the lower layers attempts to minimize average frame-level conditional entropy while attempting to maximize state occupation entropy, or in another alternative, attempts to minimize a reconstruction error. Back-propagation of error information corresponding to the final layer's error versus labeled training data may be used to iteratively modify (fine tune) the lower layer or layers relative to their coarse training. Also described is joint training, including joint training via subgroups of layers.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a deep-structured (multiple layer) conditional random field (CRF) model that improves sequential labeling and classification accuracy. A deep-structured conditional random field comprises a multiple layer CRF model in which each higher layer's input observation sequence comprises the lower layer's observation sequence and the resulting lower layer's frame-level marginal probabilities. The deep-structured conditional random field allows for distinct state representations at different layers.

As described herein, one aspect is directed towards training and evaluating the deep-structured CRF model layer-by-layer to make it efficient, e.g., from a lowest (intermediate) layer towards a highest, final layer. In one implementation, the same intermediate-layer states are used as that in the final layer so that each layer can be trained in a supervised way. In an alternative implementation, different states may be used, such that learning the intermediate layer occurs in an unsupervised way, e.g., by casting it as a multi-objective programming problem that is aimed at minimizing the average frame-level conditional entropy while maximizing the state occupation entropy, or by minimizing the reconstruction error. Also described is back-propagating the final layer error to fine tune (further modify) the intermediate layers so as to reduce the error.

It should be understood that any of the examples described herein are non-limiting examples. Further, while various types of sequential input are identified, these are only examples, and the technology is not limited to any particular type of sequential input. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and computerized learning in general.

Figure 1:
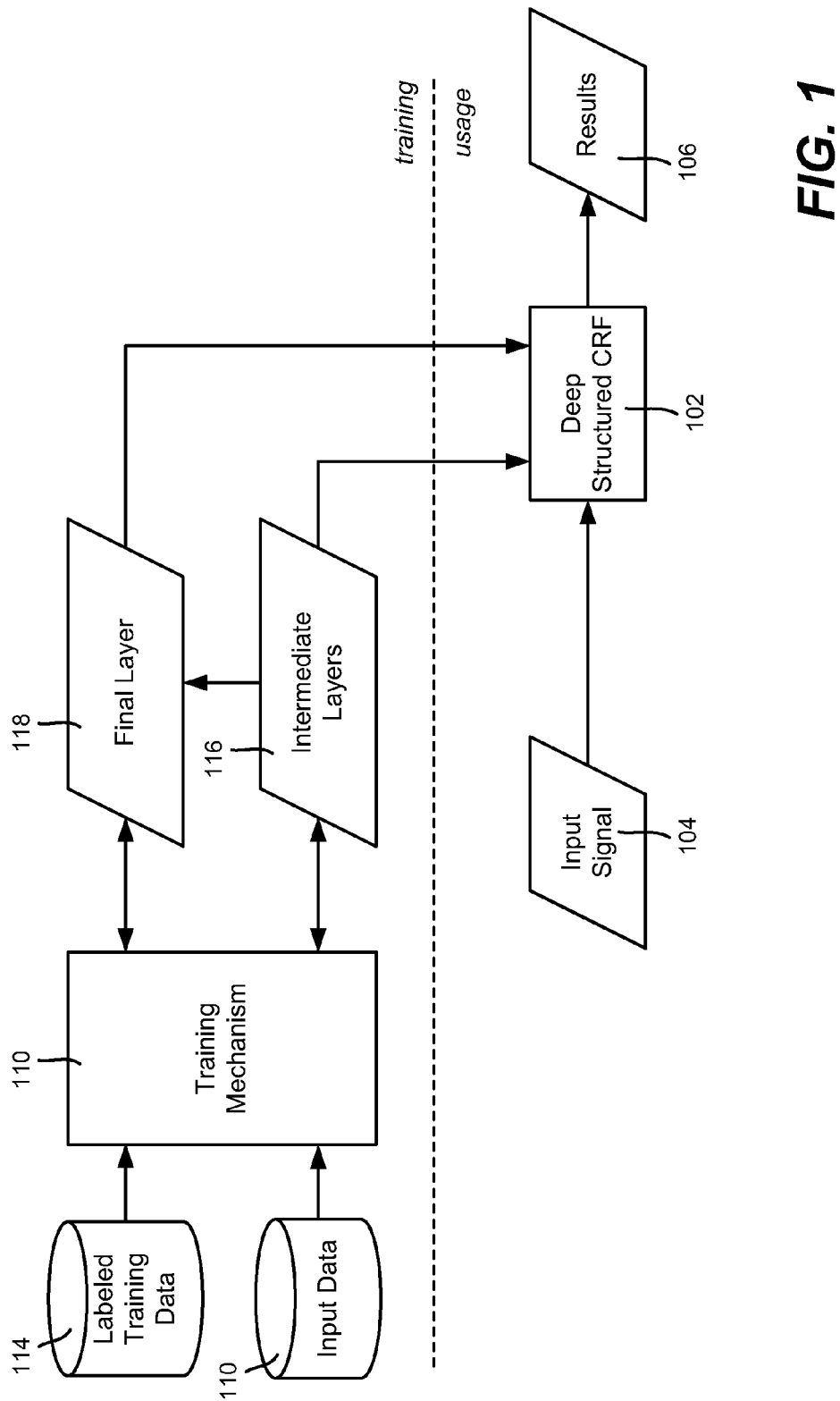
FIG. 1 is a block diagram showing example components for training and using a deep-structured conditional random field model (classifier).

FIG. 1 shows a general block diagram that represents usage and training of the deep-structured CRF model 102. In general, in usage, an input signal 104 (e.g., comprising a sequence of actual input data) is provided to the deep-structured CRF model 102, which then outputs classification results, e.g., as a set of probabilities 106. The input data may be any type of data suitable for processing by a CRF model into classification output. Some examples of such sequential input data/representative features include natural language data (speech or text) including Mel-frequency cepstral coefficients, features of words or word sub-units (e.g., phonemes), biological sequences, pixel-related data (e.g., for image processing) and so forth.

Training, described below, also takes similar input 110 into a training mechanism 112, as well as labeled training data 114. In one supervised learning implementation, training of intermediate layers 116 (which as used herein also includes the lowest layer) as well as the final layer 118 is based upon the labeled training data 114. In another (primarily) unsupervised learning implementation, training of the intermediate layers 116 does not require labeled training data, which is used in training only the final layer 118.

Various examples of training are described below, including layer-by-layer training. However, joint training (in partial subgroups or as a whole) of the layers is also feasible, as also described below. Further, once a layered CRF model is built, back propagation may be used in "fine-tuning" training, that is, based on the error measured at the final layer with labeled training data, the intermediate layers 116 may be fine tuned (e.g., iteratively modified) relative to their previous "coarse" training process to reduce that error.

In general, a linear-chain CRF may be described as follows. Given a T-frame observation sequence $x=x_1, x_2, \ldots, x_T$, the conditional probability of the state sequence $y=y_1, y_2, \ldots, y_T$ (which may be augmented with a special start ($y_0$) and end ($y_{T+1}$) state) is formulated as:

$$p(y|x; \Lambda) = \frac{\exp\left(\sum_{t,i} \lambda_i f_i(y_t, y_{t-1}, x, t)\right)}{Z(x; \Lambda)} \quad (1)$$

where $f_i(y_t, y_{t-1}, x, t)$ represents both the observation features $f_i(y_t, x, t)$fi and the state transition features $f_i(y_t, y_{t-1}, t)$fi. The partition function $$Z(x; \Lambda) = \sum_y \exp(\sum_{t,i} \lambda_i f_i(y_{t-1}, x, t)) \quad (2)$$

is used to normalize the exponential form so that it becomes a valid probability measure.

The model parameters $\Lambda = (\lambda_i)$ are typically optimized to maximize the $L_2$ regularized conditional state sequence log-likelihood:

$$J_1(\Lambda, X) = \sum_k \log p(y^{(k)}|x^{(k)}; \Lambda) - \frac{\|\Lambda\|^2}{2\sigma^2} \quad (3)$$

where $\sigma^2$ is a parameter that balances the log-likelihood and the regularization term and can be tuned using a development set. The derivatives of $J_1(\Lambda, X)$ over the model parameters $\lambda_i$ are given by:

$$\frac{\partial J_1(\Lambda, X)}{\partial \lambda_i} = \tilde{E}[f_i(y, x)] - E[f_i(y, x)] - \frac{\lambda_i}{\sigma^2} \quad (4)$$

$$= \sum_k f_i(y^{(k)}, x^{(k)}) - \frac{\lambda_i}{\sigma^2} - $$

$$\sum_k \sum_y p(y|x^{(k)}; \Lambda) f_i(y, x^{(k)})$$

which can be efficiently estimated using the known forward-backward (sum-product) algorithm. The model parameters in the CRFs may thus be optimized using algorithms such as generalized iterative scaling (GIS), gradient and conjugate gradient (e.g. L-BFGS) ascent, and RPROP.

Although useful performance has been observed using single-layer CRFs, when continuous features are used, still more improved performance can be achieved by imposing constraints on the distribution of the features, which is equivalent to expanding each continuous feature $f_i(y_t, y_{t-1}, x, t)$ into features:

$$f_{il}(y_{t-1}, y_t, x, t) = a_l(f_i(y_{t-1}, y_t, x, t)) f_i(y_{t-1}, y_t, x, t)), \quad (5)$$

where $a_l(.)$ is a weight function whose definition is well known. However, the single-layer CRFs cannot learn these expanded features automatically.

In deep-structured CRFs, multiple layers of simple CRFs are stacked together to achieve more powerful modeling and discrimination ability. Unlike previous technology, the deep-structured CRFs described herein may learn discriminative intermediate representations from raw features and combine the sources of information to obtain improved classification ability.

Figure 2:
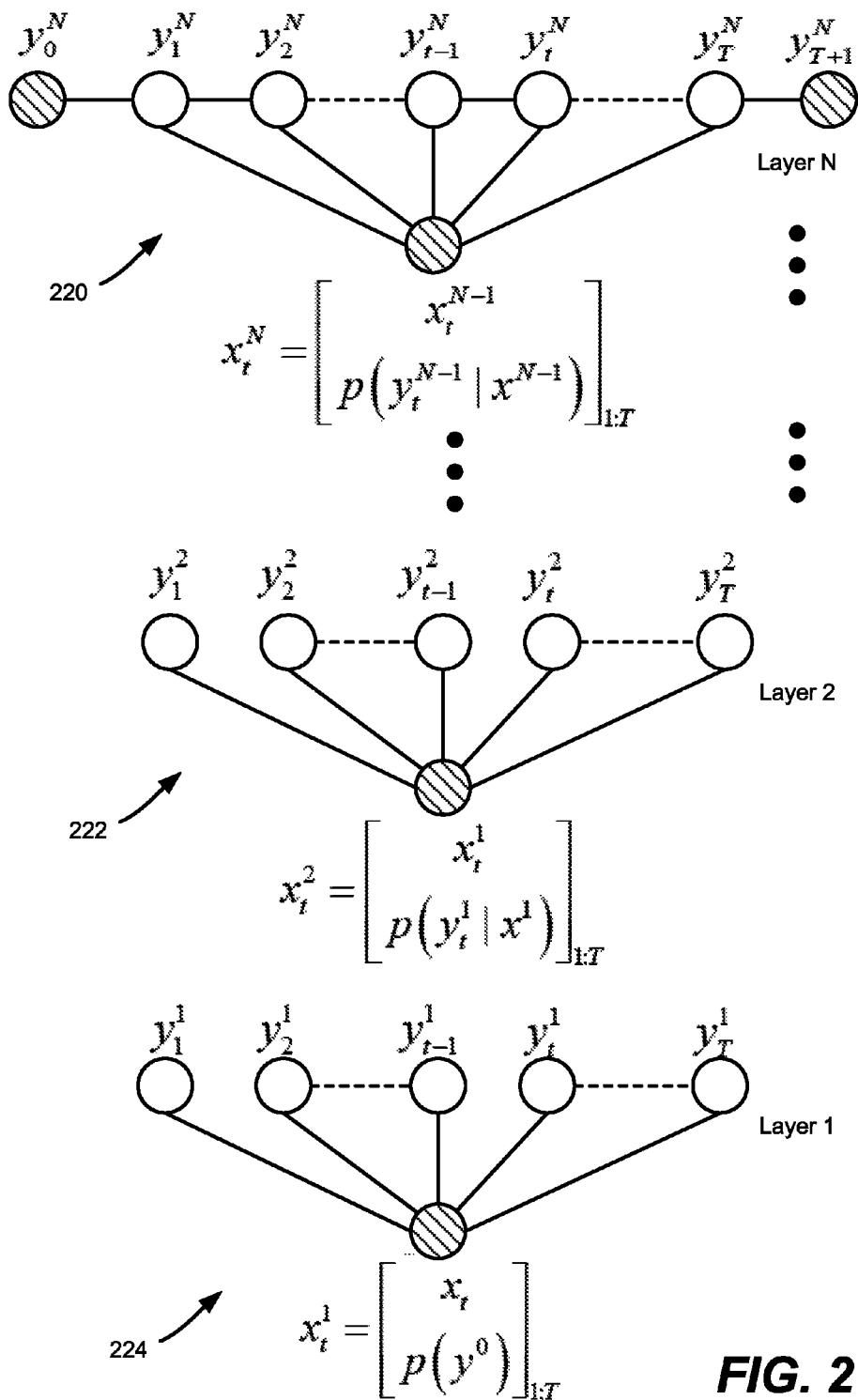
FIG. 2 is a representation of layers of a deep-structured conditional random field model.

In one implementation, an architecture of an example deep-structured CRF is represented in FIG. 2, where the final layer 220 is a linear-chain CRF and the lower layers 222 and 224 are zero-th-order CRFs that do not use state transition features. Using zero-th-order instead of linear-chain CRFs in the lower layers significantly reduces the computational cost while only slightly degrading classification performance.

Figure 3:
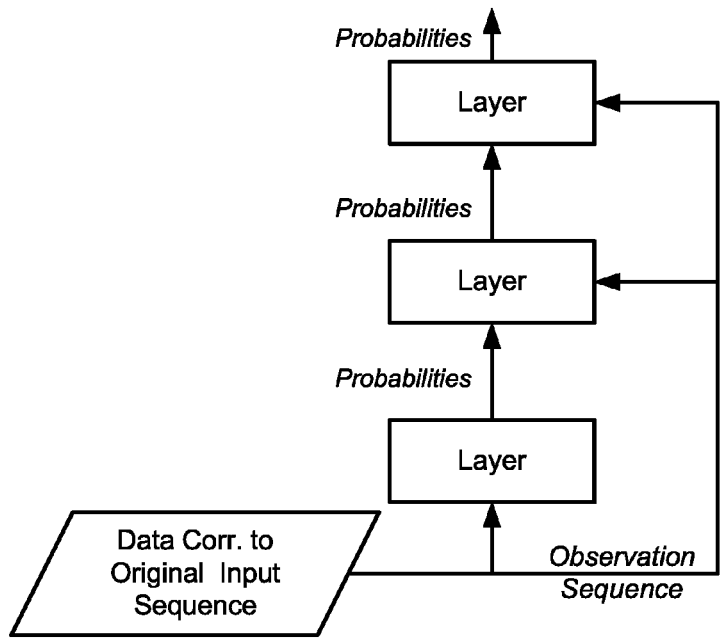
FIG. 3 is a block diagram representing how data corresponding to an input signal is processed by layers of a deep-structured conditional random field model.

In the deep-structured CRF, the observation sequence at layer j comprises the previous layer's observation sequence $x^{j-1}$ and the frame-level marginal posterior probabilities $p(y_t^{j-1}|x^{j-1})$ from the preceding layer j−1. These inputs and the general architecture are represented in FIG. 3, which is somewhat based upon the tandem structure used in some automatic speech recognition systems. Note however that the features constructed on the observations may use only part of the input information.

In a deep-structured CRF as described herein, the state sequence inference is carried out layer-by-layer in a bottom-up manner so that the computational complexity is limited to at most linear to the number of layers used. At the final layer the number of states can be directly determined by the problem to be solved and the parameters can be learned in a supervised way. The model parameter estimation is more complicated, and parameter learning can be more complex for the intermediate layers, which serve as abstract internal representations of the original observation and may or may not have different numbers of states than the final layer.

Figure 4:
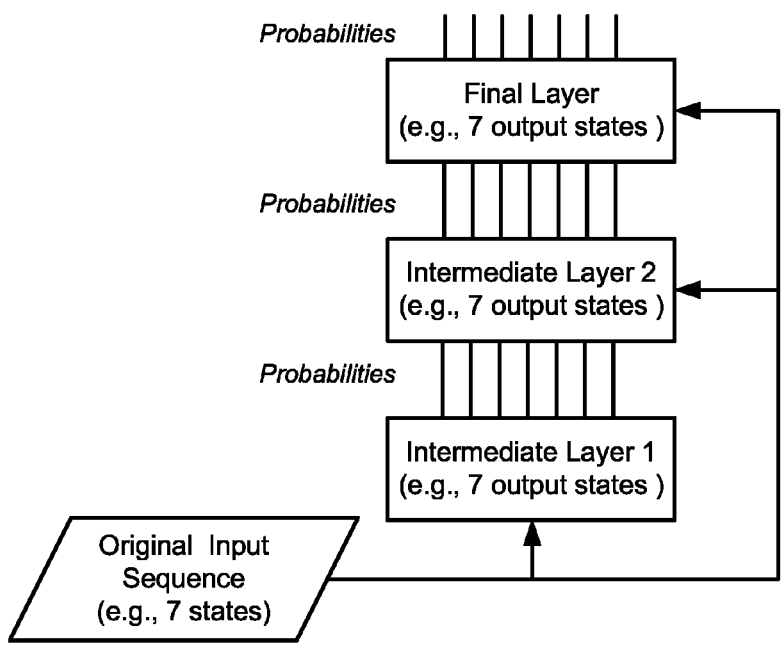
FIG. 4 is a block diagram representing how data corresponding to an input signal is processed by layers of a deep-structured conditional random field model having the same states at each layer.

Learning strategies for the deep-structured CRFs include layer-wise supervised learning, which restricts the number of states at intermediate layers to be the same as that in the final layer, as generally represented in FIG. 4. In this manner, the same label used to train the final layer can be used to train the intermediate layers.

Figure 5:
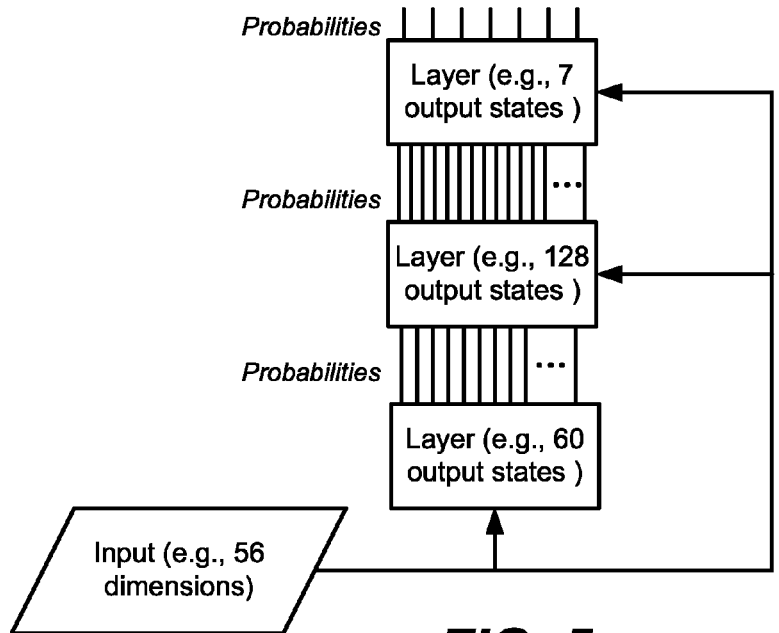
FIG. 5 is a block diagram representing how data corresponding to an input signal is processed by layers of a deep-structured conditional random field model having different states at each layer.

Another learning strategy is entropy-based layer-wise unsupervised pre-training, which may be followed by conditional likelihood-based back propagation learning. This allows for an arbitrary number of states in the intermediate layers, and is generally represented in FIG. 5. This learning scheme first learns each intermediate layer separately in an unsupervised manner, and then fine-tunes all the parameters jointly.

Layer-wise supervised learning (FIG. 4) trains the intermediate layers layer-by-layer using the same label used to train the final layer. This is accomplished by restricting the number of states at intermediate layers to be the same as that in the final layer and treating each state at intermediate layers the same as that in the final layer. Note that the output of the deep-structured CRF model is a state sequence, so the parameters in the final layer are optimized by maximizing the regularized conditional log-likelihood at the state-sequence level. In contrast to the final layer, the other layers may be trained by maximizing the frame-level marginal log-likelihood of $$J_2(\Lambda, X) = \sum_{k,t} \log p\left(y_t^{(k)} \mid x^{(k)}; \Lambda\right) - \frac{\|\Lambda\|^2}{2\sigma^2} \quad (6)$$

because this marginal probability is the only additional information passed into the higher layers. This criterion, however, is equivalent to the state-sequence level criterion $J_1(\Lambda, X)$ when the zero-th-order CRF is used in the intermediate layers since:

$$\begin{aligned}
J_1(\Lambda, X) &= \sum_k \log p(y^{(k)} \mid x^{(k)}; \Lambda) - \frac{\|\Lambda\|^2}{2\sigma^2} \quad (7)\\
&= \sum_k \log \frac{\exp\left(\sum_{t,i} \lambda_i f_i(y_t^{(k)}, y_{t-1}^{(k)}, x^{(k)}, t)\right)}{Z(x^{(k)}; \Lambda)} - \frac{\|\Lambda\|^2}{2\sigma^2}\\
&= \sum_k \sum_{t,i} \lambda_i f_i(y_t^{(k)}, x^{(k)}, t) - \log Z(x^{(k)}; \Lambda) - \frac{\|\Lambda\|^2}{2\sigma^2}\\
&= \sum_{k,t} \sum_i \lambda_i f_i(y_t^{(k)}, x^{(k)}, t) - \log Z(x^{(k)}; \Lambda) - \frac{\|\Lambda\|^2}{2\sigma^2}\\
&= J_2(\Lambda, X).
\end{aligned}$$

$J_2(\Lambda, X)$ can be optimized in a complexity of O(TY), where T is the number of frames and Y is the number of states. Since the output of each frame in the zero-th-order CRF is independent of each other, the process can be further speeded up using parallel computing techniques.

Note that the observation features at each layer can be constructed differently, and also possibly across different frames from the previous layer. This allows for the significant flexibility of the higher layers to incorporate longer-span features from lower-layer decoding results. Allowing for long-span features can be helpful for speech recognition tasks, for example.

It may be proved that the objective function $J_1(\Lambda, X)$ on the training set will not decrease as more layers are added in the deep-structure CRF. It also may be proved that the deep-structured CRF performs no worse than the single-layer CRF on the training set.

The layer-wise supervised training represented in FIG. 4 and described above works when the number of states in the intermediate layers is the same as that in the final layer so that the same supervision can be used to train each layer. This may restrict the potential of deep-structured CRFs for extracting powerful, optimization-driven internal representations automatically from the original data sequence. Thus, an alternative allows for different internal representations with different number of states in the intermediate layers, as generally represented in FIG. 5, based upon a different training algorithm with one or more different objective functions as an intermediate step.

One approach to such training as described herein is performed in an unsupervised manner, for example, in a generative way by optimizing the association between the input and the output for each intermediate layer.

As described herein, one layer-wise unsupervised learning strategy casts the intermediate layer learning problem as a multi-objective programming (MOP) learning problem. More particularly, the average frame-level conditional entropy may be minimized while maximizing the state occupation entropy at the same time. Minimizing the average frame-level conditional entropy forces the intermediate layers to be sharp indicators of subclasses (or clusters) for each input vector, while maximizing the occupation entropy guarantees that the input vectors be represented distinctly by different intermediate states.

In one implementation, the training starts from maximizing the state occupation entropy, and then updating the parameters by alternating between minimizing the frame-level conditional entropy and maximizing the average state occupation entropy. At each such epoch, each objective is optimized by allowing the other one to become slightly worse within a limited range. This range is gradually tightened epoch by epoch. The model parameters then may be further fine tuned using the conditional likelihood-based back propagation described below.

To maximize the state occupation entropy, x, h, and $\Lambda_h = \lambda_i$ denote the input, output, and parameters of an intermediate layer, respectively. The intermediate (hidden) layer state occupation entropy is defined as:

$$H(h) = -\sum_h p(h) \log p(h) \quad (8)$$

where $$p(h) = \frac{1}{K} \sum_k \sum_t p(h_t = h \mid x^{(k)}, \Lambda^h) \quad (9)$$

and where N is the total number of frames of the training data. The derivative of H(h) with respect to can be calculated as:

$$\frac{\partial H(h)}{\partial \lambda_i^h} = -\frac{\partial p(h)}{\partial \lambda_i^h} \log p(h) - \frac{\partial \log p(h)}{\partial \lambda_i^h} p(h) \quad (10)$$

$$= -[\log p(h) + 1]\frac{\partial p(h)}{\partial \lambda_i^h}$$

$$= -\frac{1}{K}[\log p(h) + 1]\sum_k \sum_t \frac{\partial p(h_t = h \mid x^{(k)}, \Lambda^h)}{\partial \lambda_i^h}.$$

Because $$\frac{\partial p(h_t = h \mid x^{(k)}, \Lambda^h)}{\partial \lambda_i^h} = \qquad (11)$$

$$[p(h_t \mid x^{(k)}, \Lambda^h) - p^2(h_t \mid x^{(k)}, \Lambda^h)]f_i(h_t, x^{(k)}, t)$$

the final gradient is:

$$\frac{\partial H(h)}{\partial \lambda_i^h} = -\frac{1}{K}[\log p(h) + 1] \qquad (12)$$

$$\sum_k \sum_t [p(h_t \mid x^{(k)}, \Lambda^h) - p^2(h_t \mid x^{(k)}, \Lambda^h)]f_i(h_t, x^{(k)}, t)$$

With respect to minimizing the frame-level conditional entropy, the frame-level conditional entropy at the intermediate layer can be written as:

$$H(h \mid x, \Lambda^h) = -\Sigma_k \Sigma_h p(h \mid x^{(k)}, \Lambda^h) \log p(h \mid x^{(k)}, \Lambda^h). \qquad (13)$$

As above, the derivative $H(h \mid x, \Lambda^h)$ with respect to $\lambda_i^h$ can be computed as:

$$\frac{\partial H(h \mid x, \Lambda^h)}{\partial \lambda_i^h} = -\sum_k \sum_t [\log p(h_t \mid x^{(k)}, \Lambda^h) + 1]\frac{\partial p(h \mid x^{(k)}, \Lambda^h)}{\partial \lambda_i^h} \qquad (14)$$

$$= -\sum_k \sum_t [\log p(h_t \mid x^{(k)}, \Lambda^h) + 1]$$

$$[p(h \mid x^{(k)}, \Lambda^h) - p2hxk, \Lambda\ hfiht, xk, t.$$

With respect to fine tuning with conditional likelihood-based back propagation, the fine tuning step aims to optimize the state sequence log-likelihood:

$$L(\Lambda^N, \Lambda^{h_{N-1}}, \ldots, \Lambda^{h_1}) = \sum_k \log p(y^{(k)} \mid x^{(k)}, \Lambda^N, \Lambda^{h_{N-1}}, \ldots, \Lambda^{h_1}) \qquad (15)$$

$$= \sum_k L^{(k)}(\Lambda^N, \Lambda^{h_{N-1}}, \ldots, \Lambda^{h_1}).$$

jointly for all parameters conditioned on all the layers, where $\Lambda^N$ is the parameter set for the final layer, and $\Lambda^{h_{N-1}}, \Lambda^{h_1}$ are parameters for the N−1 hidden layers. The observation as the input to the final layer is $$[x, f_t^{h_1} f_t^{h_2} \ldots f_t^{h_{N-1}}], t = 1, \ldots, T \qquad (16)$$

where the hidden layer's frame-level log-likelihood is $$f_t^{h_n} = \log p(h_t^n \mid x, f^{h_1}, \ldots, f^{h_{N-1}}, \Lambda^{h_n}) \text{ if } n > 1 \qquad (17)$$

and $$f_t^{h_n} = \log p(h_t^n \mid x, \Lambda^{h_n}) \text{ if } n = 1. \qquad (18)$$

The derivative of the objective function over $\lambda_i^h$ is:

$$\frac{\partial L(\Lambda^N, \Lambda^{h_{N-1}}, \ldots, \Lambda^{h_1})}{\partial \lambda_i^{h_n}} = \sum_k \sum_{j=n}^{N-1} \frac{\partial L(\Lambda^N, \Lambda^{h_{N-1}}, \ldots, \Lambda^{h_1})}{\partial f^{h_j}} \frac{\partial f^{h_j}}{\partial \lambda_i^{h_n}} \qquad (19)$$

$$= \sum_k [1 - p(y_t \mid x^{(k)}, \Lambda^N, \Lambda^{h_{N-1}}, \ldots, \Lambda^{h_1})]$$

$$\sum_{j=n}^{N-1} \lambda^{h_j} \frac{\partial f^{h_j}}{\partial \lambda_i^{h_n}}$$

In joint optimization, the objective is to maximize:

$$\mathcal{L}(\boldsymbol{\lambda}, \boldsymbol{\lambda}^h) = \sum_k \log p(y^{(k)} \mid h, \boldsymbol{\lambda}, \boldsymbol{\lambda}^h) \qquad (20)$$

where the hidden layer to observed layer feature is defined as:

$$f^h(y_t, h, x, t) = \log p(h \mid x, \boldsymbol{\lambda}^h) \qquad (21)$$

The update for the observed layer is the same as standard CRF, while for the hidden parameters, confidence back propagated from the observed layer needs to be taken into account. The derivative for hidden layer can be calculated as:

$$\frac{\partial \mathcal{L}(\boldsymbol{\lambda}, \boldsymbol{\lambda}^h)}{\partial \boldsymbol{\lambda}_j^h} = \sum_k \frac{\partial \mathcal{L}(\boldsymbol{\lambda}, \boldsymbol{\lambda}^h)}{\partial f^h(y_t, h, x^{(k)}, t)} \frac{\partial f^h(y_t, h, x^{(k)}, t)}{\partial \boldsymbol{\lambda}_j^h} \qquad (22)$$

where:

$$\frac{\partial \mathcal{L}(\boldsymbol{\lambda}, \boldsymbol{\lambda}^h)}{\partial f^h(y_t, h, x^{(k)}, t)} = [1 - p(y_t \mid x^{(k)}, \boldsymbol{\lambda})]\boldsymbol{\lambda}_j \qquad (23)$$

and $$\frac{\partial f^h(y_t, h, x^{(k)}, t)}{\partial \boldsymbol{\lambda}_j^h}$$

is the standard CRF.

$$\frac{\partial L(\Lambda^N, \Lambda^{h_{N-1}}, \ldots, \Lambda^{h_1})}{\partial \lambda_i^{h_n}} = \sum_k \sum_{j=n}^{N-1} \frac{\partial L^{(k)}(\Lambda^N, \Lambda^{h_{N-1}}, \ldots, \Lambda^{h_1})}{\partial f^{h_j}} \frac{\partial f^{h_j}}{\partial \lambda_i^{h_n}}$$

$$= \sum_k [1 - p(y_t \mid x^{(k)}, \Lambda^N, \Lambda^{h_{N-1}}, \ldots, \Lambda^{h_1})]$$

$$\sum_{j=n}^{N-1} \lambda^{h_j} \frac{\partial f^{h_j}}{\partial \lambda_i^{h_n}}$$

(24)

Figure 6:
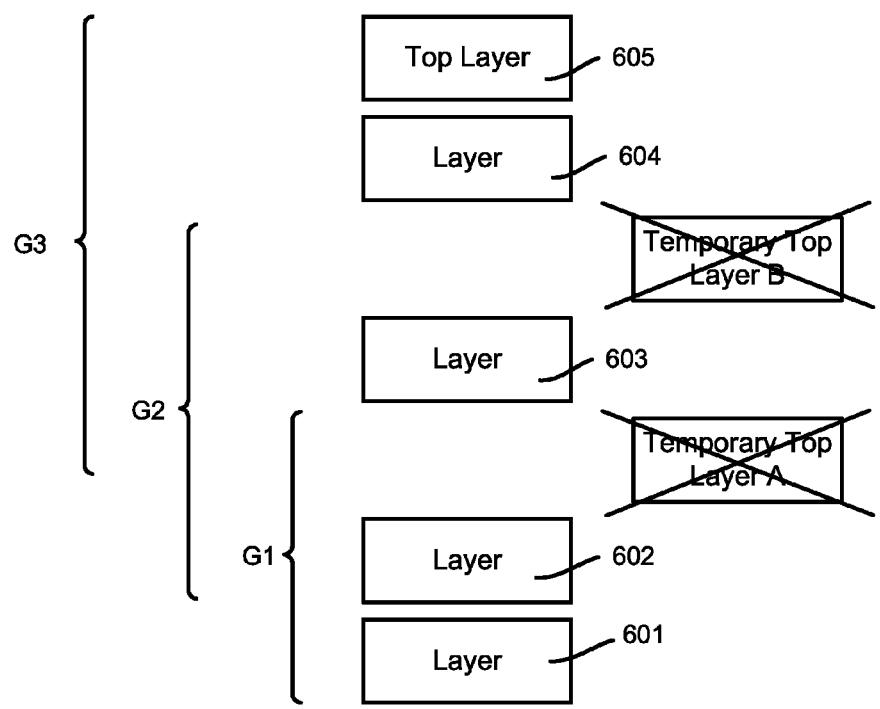
FIG. 6 is a block diagram representing how of a deep-structured conditional random field model may be trained in subgroups.

FIG. 6 shows a type of joint optimization by training subgroups. In this example, a five layer model is being trained, comprising intermediate layers 601-604 and a final layer 605. To train layers 601 and 602, a temporary top layer A is also trained, forming group G1 which is jointly trained via any suitable joint training algorithm and/or via back propagation.

Once layers 601 and 602 are trained in this manner, layer 602, 603 and a temporary top layer are trained as another subgroup, G2. Note that temporary top layer A is no longer needed in training this subgroup, and may be discarded.

At the end of training subgroup G2, temporary top layer may be discarded. Intermediate layers 603 and 604 and top layer 605 form another subgroup G3, which is jointly trained. Note however that final layer 605 is not a temporary layer, but rather the actual topmost layer. At the end of training, layers 601-605 form the five layer model. Any model having at least two layers may be jointly trained, although subgroups of three are shown. Further, it is feasible to train in subgroups larger than three, or jointly train the model as a whole.

Exemplary Operating Environment

Figure 7:
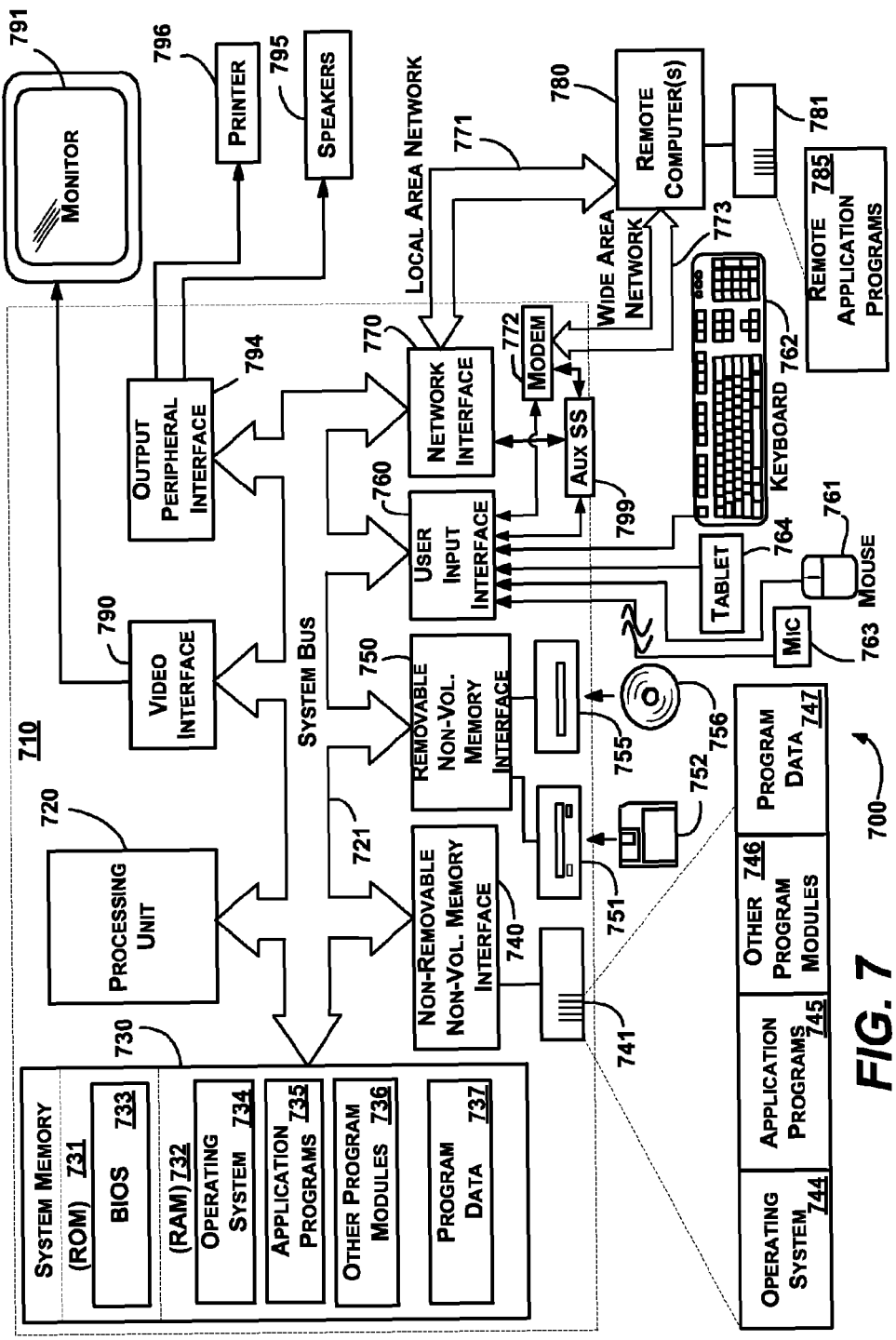
FIG. 7 shows an illustrative example of a computing environment into which various aspects of the present invention may be incorporated.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

Conclusion

While the invention is susceptible to various modifications and alternative constructions, certain illustrated embodiments thereof are shown in the drawings and have been described above in detail, as well as equations and associated descriptions. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computer-implemented method performed on at least one processor, comprising, processing an input signal with a conditional random field model having a final layer and one or more lower layers, by the at least one processor, including processing data corresponding to the input signal at each layer, outputting probability information from each lower layer to a next higher layer above that lower layer and outputting probability information from the final layer that corresponds to a classification of the input signal.

2. The computer-implemented method of claim 1 further comprising, learning one or more lower layers based upon raw features.

3. The computer-implemented method of claim 1 wherein the one or more lower layers each have same states as the final layer, and further comprising, performing supervised training of each layer.

4. The computer-implemented method of claim 1 further comprising, performing unsupervised training of the one or more lower layers, and performing supervised training of the final layer.

5. The computer-implemented method of claim 4 wherein performing the unsupervised training of the one or more lower layers comprises attempting to minimize average frame-level conditional entropy while attempting to maximize state occupation entropy.

6. The computer-implemented method of claim 4 wherein performing the unsupervised training of the one or more lower layers comprises attempting to minimize a reconstruction error.

7. The computer-implemented method of claim 1 further comprising, performing training of the layers, including back-propagating final layer error to modify one or more lower layers.

8. The computer-implemented method of claim 1 further comprising, performing joint training of at least two layers.

9. The computer-implemented method of claim 1 further comprising, performing joint training of subgroups of layers.

10. In a computing environment, a system comprising:
a memory connected to a bus system, wherein the memory includes computer executable program code; and
one or more processing units, wherein the one or more processing units executes the computer executable program code to execute a deep-structured conditional random field model that classifies an input signal into probability information for each classification type, the deep-structured conditional random field model comprising a plurality of stacked layers including a final layer, each layer below the final layer receiving at least some data corresponding to the input signal and processing that data to output probability information to a next higher layer, each next higher layer using at least some data corresponding to the input signal and the probability information from the layer below that next higher layer to output further probability information, the further probability information comprising the probability information for each classification type when the next higher layer is the final layer.

11. The system of claim 10 wherein the input signal comprises sequential input data or features representative of that sequential input data, the sequential input data or features representative of that sequential input data comprising audio-related data, visual-related data, natural language data, features of words or word sub-units, biological sequences or pixel-related data.

12. The system of claim 10 wherein for at least one layer, a number of states output by that layer is different from a number of states input into that layer from the layer below that layer.

13. The system of claim 10 further comprising a training mechanism that trains the deep-structured conditional random field model.

14. The system of claim 13 wherein the training mechanism performs joint training or back-propagation, or any combination of joint training and back-propagation.

15. The system of claim 10 wherein each layer below the final layer is trained via unsupervised training, including attempting to minimize average frame-level conditional entropy, attempting to maximize state occupation entropy, or attempting to minimize reconstruction error, or any combination of attempting to minimize average frame-level conditional entropy, attempting to maximize state occupation entropy, or attempting to minimize reconstruction error.

16. The system of claim 10 wherein each layer below the final layer is trained via supervising training.

17. One or more computer-readable storage media having computer-executable instructions, which when executed perform steps, comprising:
(a) at a lowest layer of a deep structured conditional random field model, processing data corresponding to an input signal to output probability information representative of probabilities of output states;
(b) at a next higher layer, using data corresponding to the input signal and the probability information output by layer below to output further probability information representative of probabilities of same or different states;
(c) if the next higher layer at step (b) was not the final layer, returning to step (b) to process the data corresponding to the input signal and the probability information output by the layer below; and
(d) if the next higher layer at step (b) was the final layer, outputting classification data that represents a classification of the input signal.

18. The one or more computer-readable storage media of claim 17 having further computer-executable instructions comprising, training each layer below the final layer using an unsupervised training process.

19. The one or more computer-readable storage media of claim 17 having further computer-executable instructions comprising, jointly training at least two layers of the deep structured conditional random field model.

20. The one or more computer-readable storage media of claim 17 having further computer-executable instructions comprising, training the deep structured conditional random field model, including back-propagating error information corresponding to the final layer versus labeled data to iteratively modify at least one layer below the final layer that was previously trained in a coarse training process so as to reduce that error information.

* * * * *